United States Patent

Bottou et al.

Patent Number: 5,900,953
Date of Patent: May 4, 1999

[54] METHOD AND APPARATUS FOR EXTRACTING A FOREGROUND IMAGE AND A BACKGROUND IMAGE FROM A COLOR DOCUMENT IMAGE

[75] Inventors: Leon Bottou, Highlands; Yann Andre LeCun, Lincroft, both of N.J.

[73] Assignee: AT&T Corp, Middletown, N.J.

[21] Appl. No.: 08/877,417

[22] Filed: Jun. 17, 1997

[51] Int. Cl.[6] .............................. H04N 1/46; H04N 1/64
[52] U.S. Cl. .................... 358/540; 358/464; 382/176
[58] Field of Search ........................... 358/433, 455, 358/456, 458, 462, 464, 465, 466, 475, 522, 524, 539, 540; 382/162, 168, 170, 171, 172, 175, 176, 232

[56] References Cited

U.S. PATENT DOCUMENTS

| | | | |
|---|---|---|---|
| 4,831,659 | 5/1989 | Miyaoka et al. | 358/433 |
| 5,222,154 | 6/1993 | Graham et al. | 382/18 |
| 5,280,367 | 1/1994 | Zuniga | 358/462 |
| 5,321,776 | 6/1994 | Shapiro | 358/432 |
| 5,414,780 | 5/1995 | Carnahan | 382/276 |
| 5,610,993 | 3/1997 | Yamamoto | 382/124 |
| 5,778,092 | 7/1998 | MacLeod et al. | 382/176 |
| 5,828,784 | 10/1998 | Miyashita et al. | 382/232 |

*Primary Examiner*—Edward L. Coles
*Assistant Examiner*—Joseph R. Pokrzywa

[57] ABSTRACT

A method and apparatus extracts a foreground image and a background image from a color document image. The color document image is divided into a plurality of multiscaled grids. Each of the grids includes a plurality of blocks and the resolution of the plurality of blocks increases for each successive grid. The background color and the foreground color of each block of the largest grid is first determined. Then the background color and the foreground color of each block of the smaller grids are determined iteratively, using biasing information from each block's corresponding block, until the background and foreground colors of all of the blocks of all of the grids have been determined. Finally, the foreground and background images are formed from the determined background color and foreground color of each block of the smallest grid.

10 Claims, 6 Drawing Sheets

METHOD AND APPARATUS FOR EXTRACTING A FOREGROUND IMAGE AND A BACKGROUND IMAGE FROM A COLOR DOCUMENT IMAGE

BACKGROUND OF THE INVENTION

The present invention is directed to a method and apparatus for processing a color document image. More particularly, the present invention is directed to a method and apparatus for extracting a foreground image and a background image from a color document image.

The popularity of the Internet has led to a dramatic increase in the need to transmit electronic color document images over wide area networks. Because of bandwidth limitations in most networks, the color images typically must be compressed before they are transmitted.

Most known compression techniques are optimized for data with specific attributes. For example, the Joint Bi-level Image Experts Group ("JBIG") compression technique, disclosed in the International Telecommunication Union ("ITU") Recommendation T.82 (1993), places a high emphasis on maintaining the detail and structure of the input. Therefore, JBIG is ideally suited for compressing black & white text and line-art data ("bilevel data"). Similarly, the Joint Photographic Experts Group ("JPEG") compression technique, disclosed in ITU Recommendation T.81 (1993), is ideally suited for compressing color pictures and other color images because it places a high emphasis on maintaining the smoothness and accuracy of the colors.

The Mixed Raster Content Color ITU-T Recommendation T.44 (1997) discloses that it is desirable to decompose a color image into three layers before compressing the image: 1) a bilevel layer of text and line art; 2) a color layer representing the background color of the image; and 3) a color layer representing the foreground color of the image. Each of the layers can then be compressed using the most optimum compression technique and transmitted independently However, ITU recommendation T.44 does not disclose a method or apparatus for extracting the background and foreground layers.

Based on the foregoing, there is a need for a method and apparatus for extracting a foreground image and a background image from a color document image.

SUMMARY OF THE INVENTION

The present invention is a method and apparatus for extracting a foreground image and a background image from a color document image. In one embodiment of the present invention, the color document image is divided into a plurality of multiscaled grids. Each of the grids includes a plurality of blocks and the resolution of the plurality of blocks increases for each successive grid.

The background color and the foreground color of each block of the largest grid is first determined. Then the background color and the foreground color of each block of the smaller grids are determined iteratively, using biasing information from each block's corresponding block, until the background and foreground colors of all of the blocks of all of the grids have been determined. Finally, the foreground and background images are formed from the determined background color and foreground color of each block of the smallest grid.

DETAILED DESCRIPTION

Figure 1:
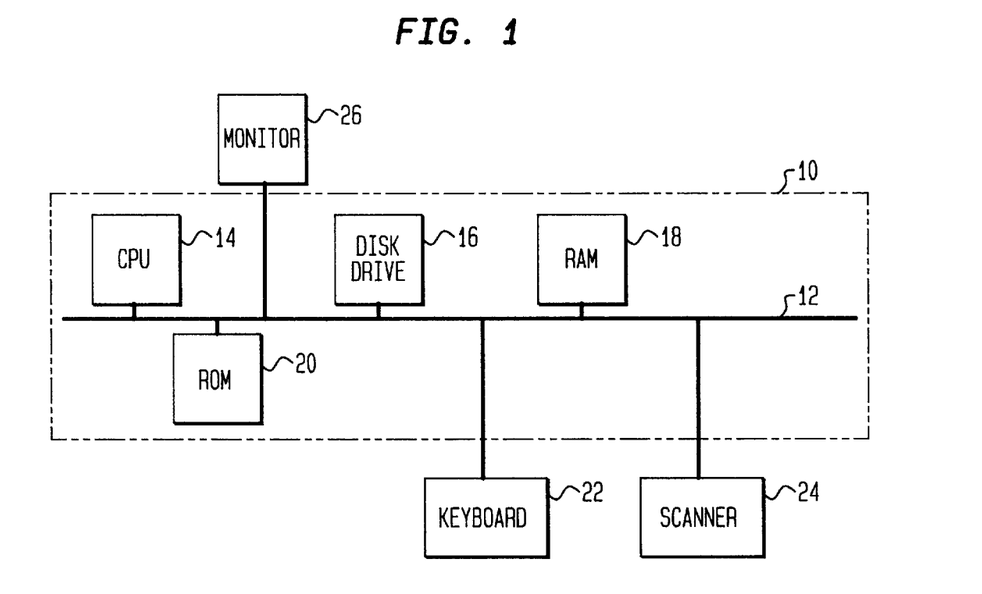
FIG. 1 is a block diagram of a computer that implements one embodiment of the present invention.

The present invention is a method and apparatus for extracting a foreground image and a background image from a color document image. FIG. 1 is a block diagram of a computer that implements one embodiment of the present invention. The computer 10 includes a bus 12. Bus 12 interconnects all components coupled to it in a known manner. Computer 10 further includes a central processing unit ("CPU") 140 In one embodiment, CPU 14 is a 175 MHz R10000 CPU from MIPS Corporation.

Computer 10 further includes a plurality of storage devices. The storage devices include a disk drive 16, read-only memory ("ROM") 20 and random access memory ("RAM") 18. Coupled to computer 10 is a monitor 26 for displaying output and a keyboard 22 for providing input to computer 10. Further coupled to computer 10 is a scanner 24 that scans a color document and converts it into a digitized color document image. The color document image is stored in a storage device of computer 10. The color document image that is stored in computer 10 comprises a plurality of image pixels.

In one embodiment of the present invention, the functionality of steps that will be described herein are implemented as software instructions that are stored on a storage device of computer 10 and executed by CPU 14. In another embodiment, the steps are implemented using hardware devices, or a combination of software and hardware devices The document images used in the steps are formed by scanning a document using scanner 24.

In order to describe how to extract a foreground and background image from a varied, multicolor image, it is useful to first describe how to extract the background and foreground color from a bicolor document image (i.e., an image with a quasi-uniform background and foreground color).

Figure 2:
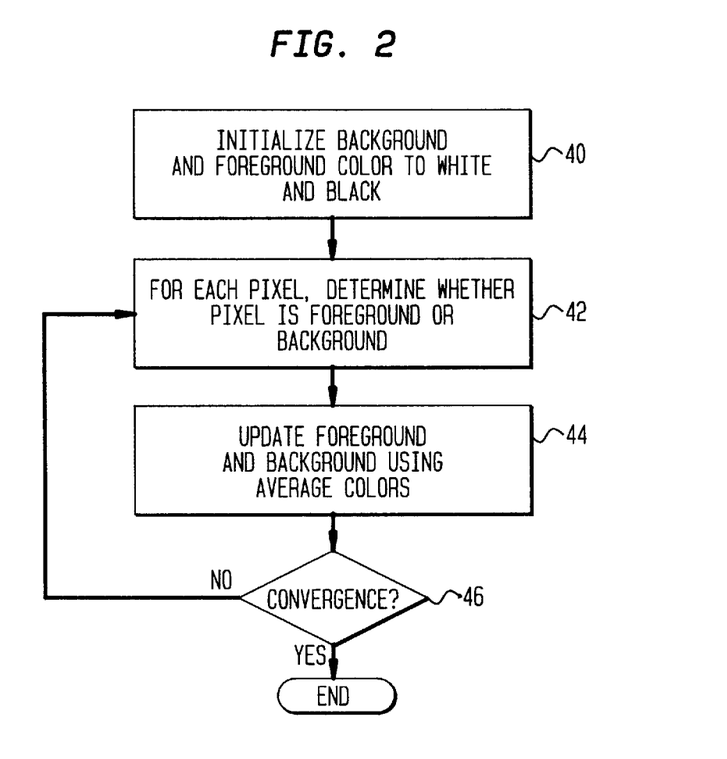
FIG. 2 is a flowchart of a clustering process that extracts the background and foreground colors from a bicolor document image.

One approach to extract the foreground and background color is to create a three-dimensional ("3-D") color histogram of the bicolor image. A 3-D color histogram, which is well known, includes for each possible color in the image a count of the number of pixels in the image having that color. These counts are organized along three axes: red, green and blue, each ranging in intensity from 0 to 255. Therefore, at the origin (0, 0, 0) each of the three intensities are 0 and the corresponding color is black. Likewise, at the far corner of the 3-D color histogram is the point (255, 255, 255) corresponding to the color white A 3-D color histogram of a bicolor document will have two peaks, corresponding to the background and foreground colors. From these peaks, the background and foreground colors can be extracted. Typically, the highest peak is the background color and the lowest peak is the foreground color because there is usually more background than foreground in a document In the alternative, extraction of the background and foreground colors of a bicolor document can be achieved by implementing a clustering process that can be executed on computer 10 of FIG. 1 FIG. 2 is a flowchart of a clustering process that extracts the background and foreground colors from a bicolor document image. The clustering process of FIG. 2 (the "bicolor process") is derived from the "K-means" algorithm disclosed in J. MacQueen, "Some Methods for Classification and Analysis of Multivariate Observations", *Proceedings of the Fifth Berkeley Symposium on Mathematics, Statistics and Probabilities,* Vol. 1, pp. 281–297 (1967).

At step 40 of the bicolor process, the background and foreground colors, which are stored in computer 10 as variables, are initialized to white and black, respectively. This insures that the extracted color with the highest luminosity will be returned as the background color, and the extracted color with the lowest luminosity will be returned as the foreground color.

At step 42, for each pixel in the image, a determination is made as to whether that pixel is a foreground or background pixel by comparing the distances between the pixel color and the current foreground and background colors In one embodiment, the distances between colors are determined by calculating the square root of the sum of the squares of the differences between the red, green and blue coordinates of the colors. If the pixel color is closer to the current foreground color, the pixel is determined to be a foreground pixel, and vice versa.

At step 44 the current foreground color is updated by computing the average color of all the pixels that were determined to be foreground pixels in step 42. Likewise, the current background color is updated by computing the average color of all the pixels that were determined to be background pixels in step 42.

At step 46 it is determined whether the process has converged Step 42 must be executed at least twice before the process is determined to have converged. The process is determined to have converged if the pixels determined to be foreground pixels at step 42 are the identical pixels that were determined to be foreground pixels when step 42 was previously executed (consequently, the pixels determined to be background pixels at step 42 must be the identical pixels that were determined to be background pixels when step 42 was previously executed). If the process is determined to have converged at step 46, then the current background and foreground colors are considered the extracted background and foreground colors of the bicolor document. If the process has not converged, step 42 is repeated.

The bicolor process of FIG. 2 typically converges very quickly The bicolor process can be implemented to converge even faster with the use of stochastic approximations that are disclosed in L. Bottou et al., "Convergence Properties of the K-Means Algorithms", *Advances in Neural Information Processing Systems,* vol. 7, MIT Press (1995).

Figure 3:
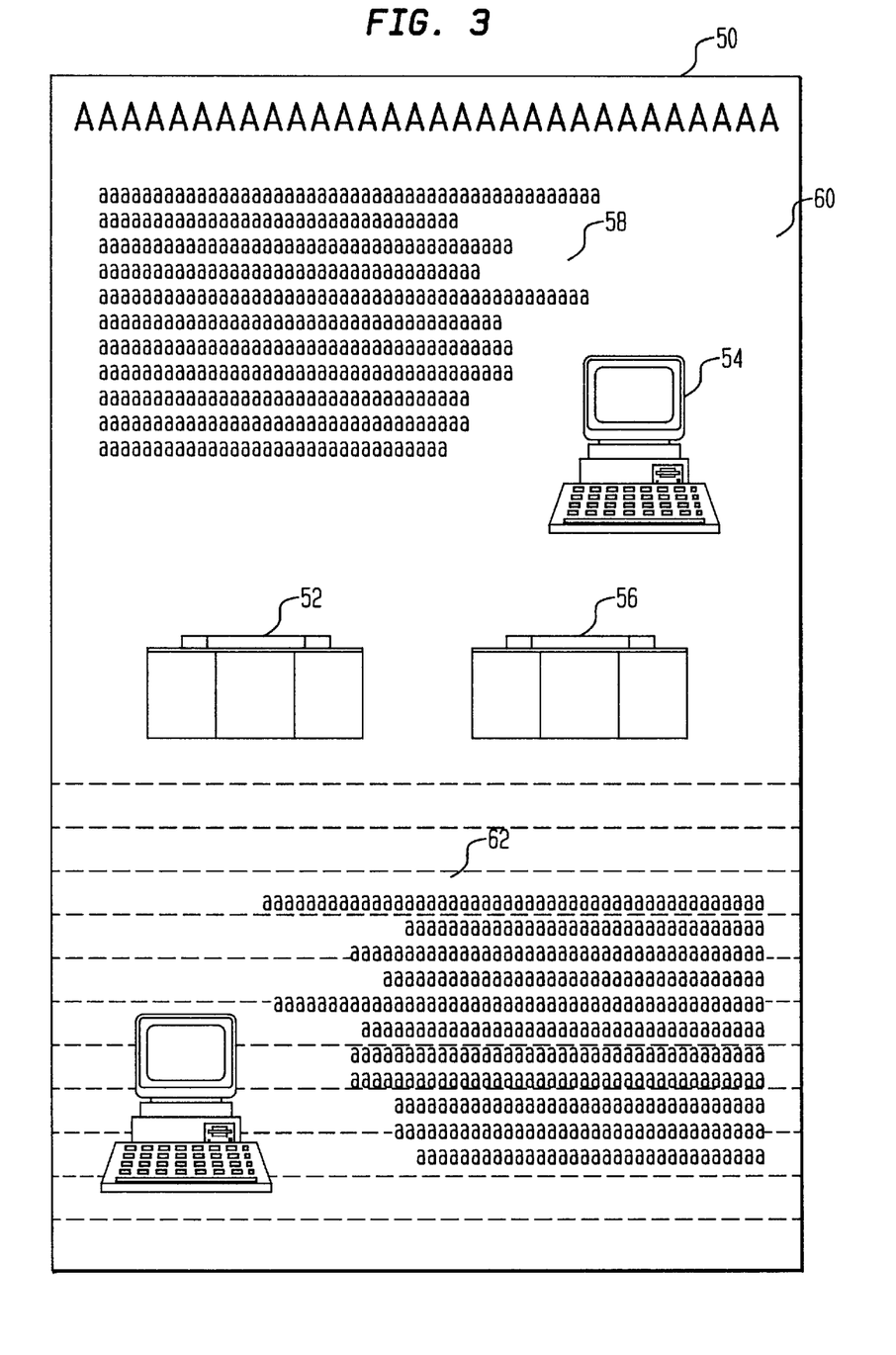
FIG. 3 illustrates a typical color document image.

FIG. 3 illustrates a typical color document image. The color image 50 includes text 58 and various color pictures 52, 54 and 56. Color image 50 also includes a white background 60 and a colored background 62. Because a typical color document image such as color image 50 includes more than two colors, the bicolor process of FIG. 2, by itself, will not properly extract the background and foreground images of document 50.

Figure 4:
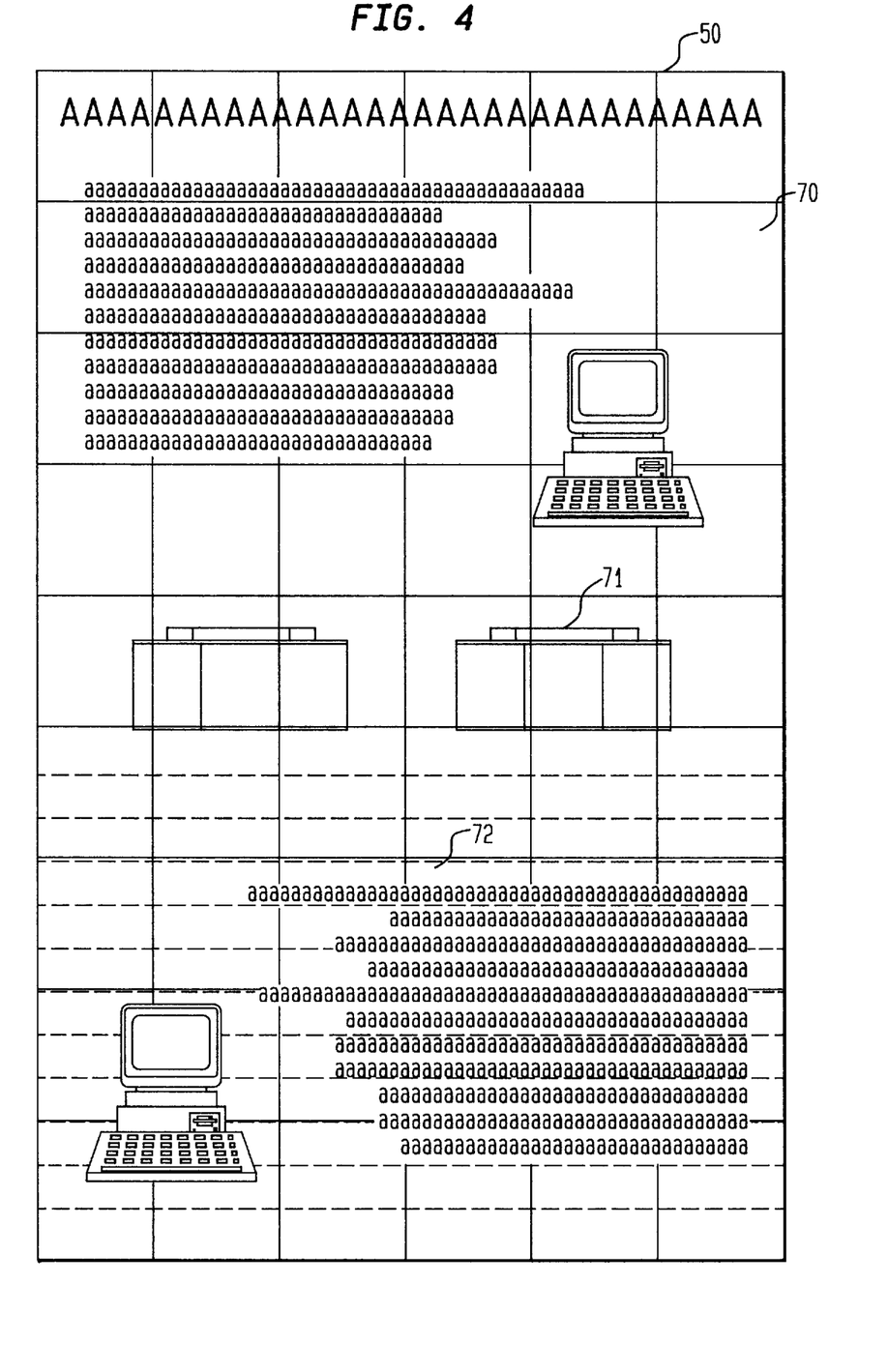
FIG. 4 illustrates a color document divided into rectangular blocks.

One improvement on the bicolor process is to divide the color document image into rectangular blocks of pixels of a single size. FIG. 4 illustrates color document image 50 divided into rectangular blocks 70, 71, 72, etc. The bicolor process of FIG. 2 can then be performed for each block and the background and foreground colors of each block can be combined to form a background and foreground image. However, this method is affected by several problems involving the choice of a block size.

Specifically, the blocks should be small enough to capture a foreground color change, for example, of a red word in a line of otherwise black text. The size of the smallest characters should therefore be the maximum size of the blocks. However, if the blocks are too small, the number of blocks entirely located outside the text area, for example block 71, increases. Such blocks contain only background pixels. Blocks may also be entirely located inside the ink of a big character. Such blocks contain only foreground pixels. The bicolor process fails in both cases to determine a pair of well contrasted foreground and background colors for these blocks. This negatively affects the background and foreground images for the entire document 50.

The present invention overcomes the above problems by dividing the document 50 into a plurality of multiscaled grids, with each grid including a plurality of blocks. The blocks of each grid are the same size. The block size of each successive grid is a fraction of the size of the blocks of the previous grid (i.e., each successive grid has an increasing resolution of blocks) The color information of larger blocks is then used to bias the determination of the color information of successive smaller blocks.

Figure 5:
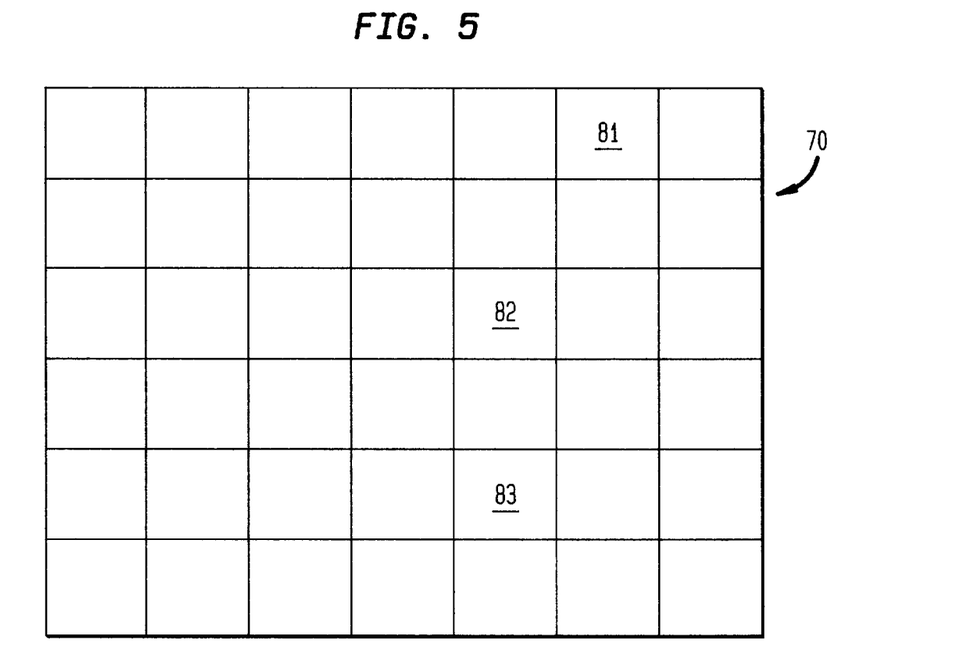
FIG. 5 illustrates part of a second grid of a color document.

For example, FIG. 4 illustrates color document image 50 divided into a first grid that includes the largest size blocks. This first grid is referred to as the "largest" grid. The second grid is formed by dividing each block of the first grid into a set of smaller blocks. FIG. 5 illustrates part of a second grid for document image 50. In FIG. 5, block 70 from FIG. 4 is further divided into a plurality of smaller blocks 81, 82, 83, etc. Each block in FIG. 4 is similarly divided into smaller blocks.

Figure 6:
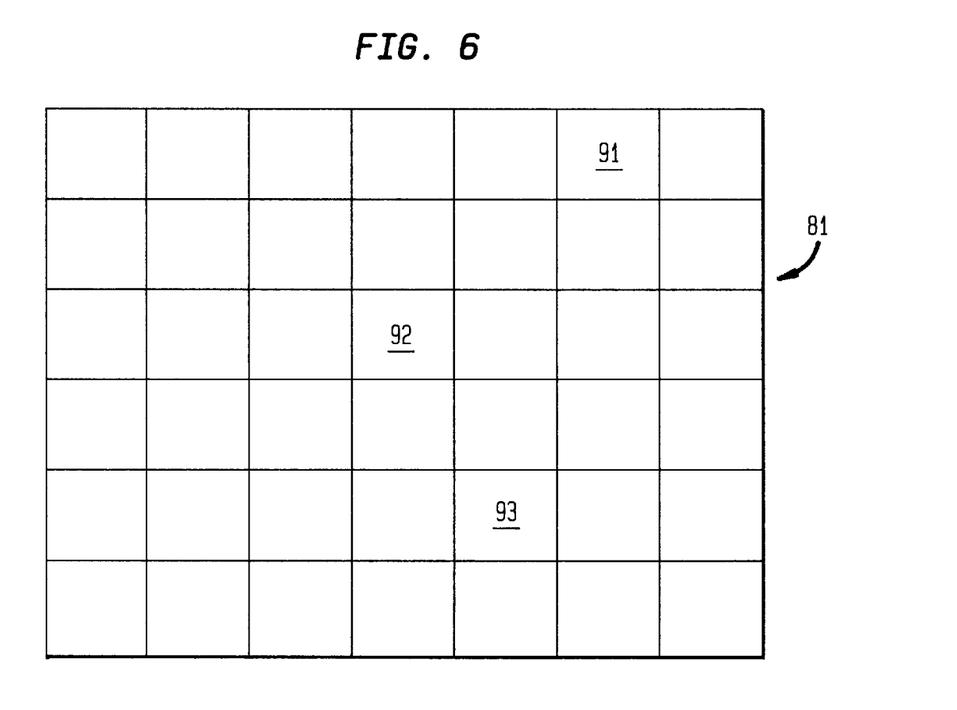
FIG. 6 illustrates part of a third grid of a color document.

Likewise, FIG. 6 illustrates part of a third grid for document image 50. In FIG. 6, block 81 from FIG. 5 is further divided into a plurality of smaller blocks 91, 92, 93, etc. Each block in FIG. 5 is similarly divided into smaller blocks. Therefore, document image 50 is ultimately divided into a plurality of blocks the size of blocks 91–93 when it is divided by the third grid. Document image 50 is further divided into successive grids until the block size of the smallest grid is a predetermined size. The predetermined size should be slightly smaller than the size of the smallest readable character in document image 50.

Figure 7:
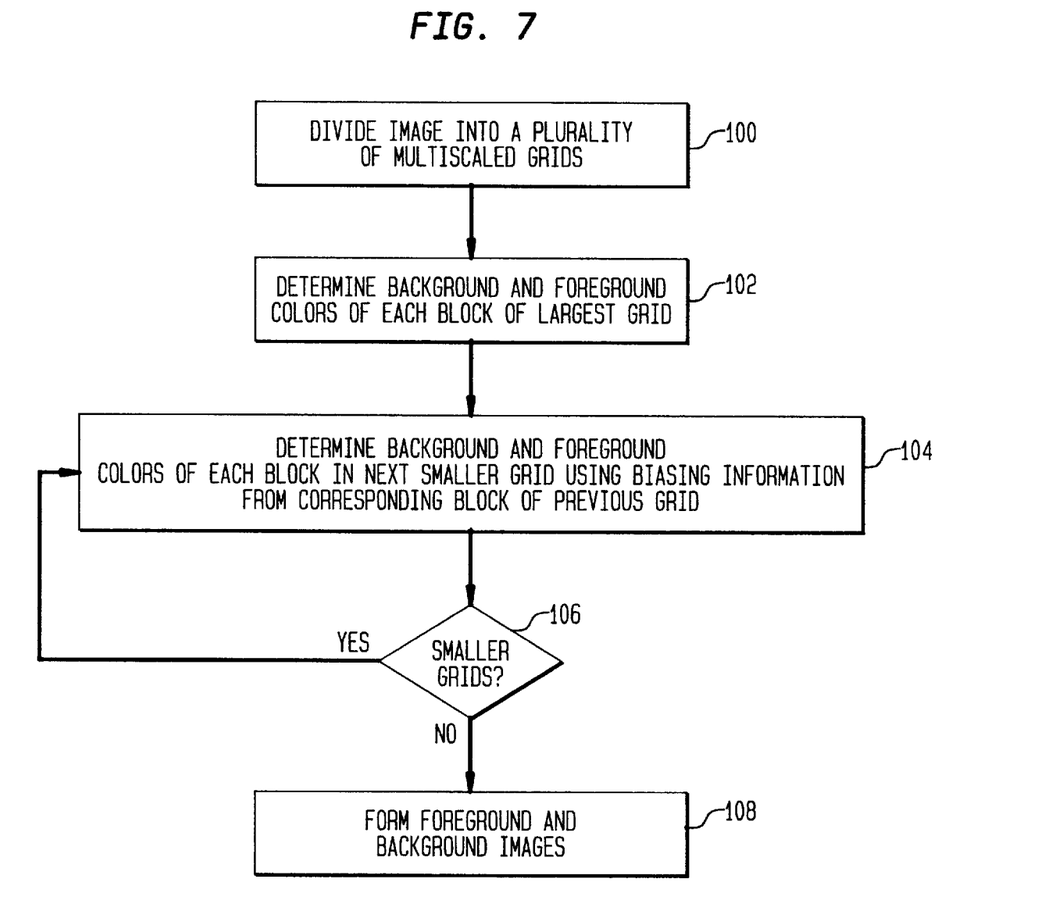
FIG. 7 is a flowchart of the steps performed by one embodiment of the present invention to extract the background and foreground image of a color document image using multiscaled grids.

FIG. 7 is a flowchart of the steps performed by one embodiment of the present invention to extract the background and foreground image of a color document image using multiscaled grids. At step 100, the document image is divided into a plurality of multiscaled grids as shown in FIGS. 4–6, with each successive grid having an increasing resolution of blocks. The number of grids is determined by first determining the desired size of the smallest blocks.

At step 102, the background and foreground colors of each block of the largest grid are determined. The largest grid is the grid that includes the largest size blocks (i.e., the grid with the lowest resolution). Any method can be used to determine the foreground and background colors, including the 3-D histogram method and the bicolor process previously described.

At step 104, the background color and the foreground color of each block in the next smaller grid is determined. The determination is made for a current block by using biasing information from the corresponding block of the previous grid (i.e., the block of the previous grid containing the center of the current block). The biasing information, for example, can be the foreground and background colors determined for the corresponding block of the previous grid. Therefore, the determination of the background and foreground colors of block 81 of FIG. 5 can be biased with the background and foreground colors of block 70 that were previously determined.

The corresponding block is larger than the current block and therefore covers several blocks of the current grid adjacent to the current block. The foreground and background colors of the corresponding block represent the dominant colors of all of the covered blocks.

The biasing information is used in order to ensure that the foreground and background colors of the current block are close to the foreground and background colors determined for the corresponding block, unless the color distribution of the pixels of the current block provides strong evidence that the current block significantly differs from the adjacent blocks covered by the same corresponding block in the previous grid.

In one embodiment, the colors are biased in step 104 using the following equation:

New color of current block = $\alpha$(calculated color of current block) + $(1 - \alpha)$ (color of corresponding block of previous grid), where $0 < \alpha < 1$.

At step 106, it is determined whether there are any smaller grids than the current grid. If there are, step 104 is repeated. If there are no smaller grids, at step 108 the background and foreground color images are formed by combining the determined foreground and background colors of the blocks in the smallest grid. The smallest grid is the grid that includes the smallest size blocks (i.e., the grid with the highest resolution).

Figure 8:
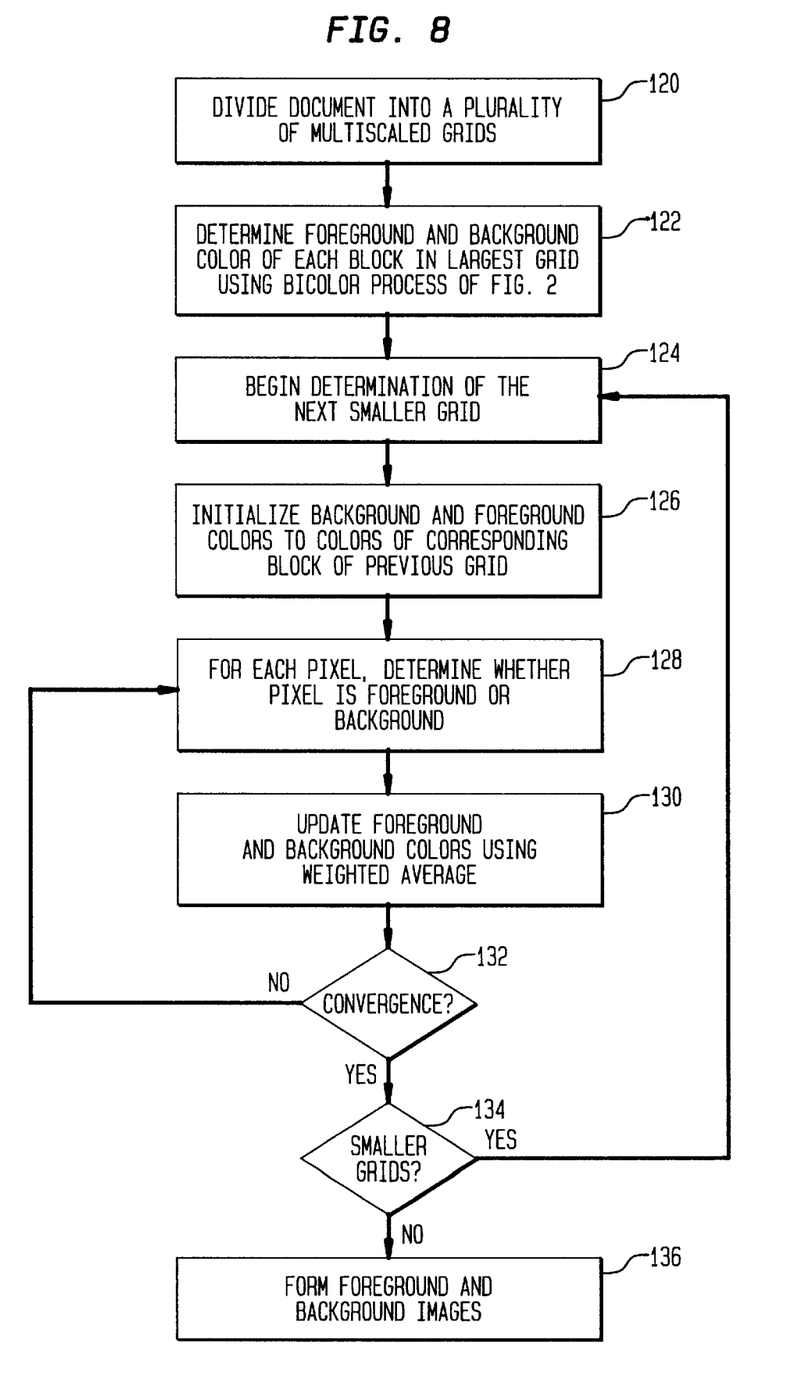
FIG. 8 is a flowchart of the steps performed in another embodiment of the present invention to extract background and foreground images from a color document image.

FIG. 8 is a flowchart of the steps performed in another embodiment of the present invention to extract background and foreground images from a color document image. The embodiment of FIG. 8 implements the bicolor process of FIG. 2 and a modification of the bicolor process to determine background and foreground colors of each block.

At step 120, the document is divided into a plurality of multiscaled grids as shown in FIGS. 4–6, with each successive grid having an increasing resolution of blocks. The number of grids is determined by first determining the desired size of the smallest blocks.

At step 122, the foreground and background colors of each block in the largest grid is determined using the bicolor process of FIG. 2.

At step 124, the determination of the background colors of the next smaller grid is initiated This determination is performed using a modification of the bicolor process of FIG. 2 in steps 126–132.

At step 126, the foreground and background colors of each block in the grid are initialized to the foreground and background colors that were determined for the corresponding block of the previous grid. For example, block 92 of FIG. 6 is initialized with the background and foreground colors that were previously determined for block 81.

At step 128, for each pixel of each block, a determination is made as to whether that pixel is a foreground or background pixel by comparing the distances between the pixel color and the current foreground and background color of that block.

At step 130, the foreground color of each block is updated using a weighted average according to the following equation:

New foreground color of block = 
    $\alpha$(average color of all foreground pixels of block) + 
        $(1 - \alpha)$(foreground color of corresponding block);

and

New background color of block = 
    $\alpha$(average color of all background pixels of block) + 
    $(1 - \alpha)$(background color of corresponding block), where $0 < \alpha < 1$.

At step 132, for each block in the current grid it is determined whether the process of FIG. 8 has converged. Step 128 must be executed at least twice before the process is determined to have converged. The process is determined to have converged if the pixels determined to be foreground pixels at step 128 are the identical pixels that were determined to be foreground pixels when step 128 was previously executed (consequently, the pixels determined to be background pixels at step 128 must be the identical pixels that were determined to be background pixels when step 128 was previously executed) If the process is determined to have converged at step 132 for every block, then the current background and foreground colors are considered the extracted background and foreground colors for that block. If it is determined that the process has not converged for all blocks, step 128 is repeated for the blocks that have not converged until all blocks in the current grid have converged at step 132.

At step 134, it is determined whether there are any smaller grids than the current grid. If there are, step 124 is repeated for the next smaller grid. If there are no smaller grids, at step 136 the background and foreground color images for the color document image are formed by combining the foreground and background colors of the blocks in the smallest grid.

The process of FIG. 8 eliminates the problems discussed in conjunction with dividing the document into fixed block sizes. For example, if the current block contains only background pixels, a small proportion of the foreground and background colors of the corresponding block will play a significant role. The resulting background color will be the average color of the pixels of the block. The resulting foreground color will be the foreground color of the corresponding block. If however the current block contains pixels representing two nicely contrasted colors, the small proportion of colors identified for the larger block will have a negligible impact on the resulting clusters.

In one embodiment of the present invention, the steps of FIG. 8 are implemented on computer 10. Color images are scanned by scanner 24 at twenty-four bits/pixel and three hundred pixels/inch. The sequence of grids of decreasing block sizes is built by first constructing the highest resolution grid using a block size of twelve by twelve pixels. This block size generates foreground and background colors at twenty-five pixels/inch. Successive grids with decreasing resolutions are built by multiplying the block width and height by four until either the block width or height exceed the page size. The blocks located on the edge of the color image are moved inwards until they are entirely located within the image boundaries. The variable $\alpha$, which is used in step 130, equals 0.9.

As described, the background and foreground images of a color document image are extracted by the present invention by dividing the document image into a plurality of multiscaled grids of blocks. The colors of each block of each grid are determined by using biasing information from a corresponding block.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of extracting a foreground image and a background image from a color document image comprising the steps of:

(a) dividing the color document image into a plurality of multiscaled grids, wherein each of the grids includes a plurality of blocks and the resolution of the plurality of blocks increases for each successive grid, and wherein the plurality of grids include a largest grid and a smallest grid;

(b) determining a first background color and a first foreground color of each block of the largest grid;

(c) determining a second background color and a second foreground color of each block of a next successive grid using biasing information from a corresponding block;

(d) repeating steps (c) and (d) if the second background colors and the second foreground colors of each block of the smallest grid has not been determined; and (e) forming the foreground and background images from the determined second background color and second foreground color of each block of the smallest grid;

wherein step (e) comprises the steps of:

(e-1) forming the foreground image by combining the determined second foreground colors of each block of the smallest grid; and (e-2) forming the background image by combining the determined second background colors of each block of the smallest grid.

2. The method of claim 1, wherein step (c) comprises the step of:

(c-1) initializing the second background color and the second foreground color of each block of the next successive grid to a third background color and a third foreground color of the corresponding block.

3. The method of claim 2, wherein step (c) further comprises the steps of:

(c-2) determining whether each pixel of each block of the next successive grid is a foreground pixel or a background pixel; and (c-3) updating the second background color and the second foreground color of each block of the next successive grid using a weighted average based on the corresponding block.

4. The method of claim 3, wherein step (c) further comprises the steps of:

(c-4) determining whether each block of the next successive grid has converged; and (c-5) repeating steps (c-2), (c-3), (c-4) and (c-5) if at step (c-4) it is determined that each block of the next successive grid has not converged.

5. The method of claim 1, wherein the corresponding block of each block of the next successive grid is a first block of the previous grid, wherein the first block includes a center of the block of the next successive grid.

6. The method of claim 3, wherein step (c-3) comprises the following steps:

(c-3-1) determining an average foreground color of every pixel that is determined to be a foreground pixel in step (c-2);

(c-3-2) forming a first operand by multiplying the average foreground color by a, wherein $0<\alpha<1$;

(c-3-3) forming a second operand by multiplying the third foreground color by $(1-\alpha)$; and (c-3-4) adding together the first operand and the second operand.

7. The method of claim 3, wherein step (c-2) comprises the step of:

(c-2-1) comparing the distances of each pixel from the second background color and the second foreground color.

8. A system for extracting a foreground image and a background image from a color document image comprising:

a storage device that stores the color document image;

a central processing unit coupled to the storage device and programmed to:

divide the color document image into a plurality of grids, said plurality of grids varying from a first grid having a plurality of blocks of a largest size to a last grid having a plurality of blocks of a smallest size;

determine a first background color and a first foreground color of each block of the first grid;

determine a second background color and a second foreground color of each block of a next successive grid of the plurality of grids iteratively using biasing information from a corresponding block of a preceding grid until the next successive grid is the last grid;

form the foreground and background images from the determined second background color and second foreground color of each block of the last grid;

initialize the second background color and the second foreground color of each block of the next successive grid to a third background color and a third foreground color of the corresponding block;

determine whether each pixel of each block of the next successive grid is a foreground pixel or a background pixel; and update the second background color and the second foreground color of each block of the next successive grid using a weighted average based on the corresponding block.

9. The system of claim 8, wherein the corresponding block of each block of the next successive grid is a first block of the previous grid of the next successive grid, wherein the first block includes a center of the block of the next successive grid.

10. The system of claim 8, further comprising a scanner coupled to said storage device that forms the color document image from a color document.

* * * * *